United States Patent [19]
Nagae et al.

[11] Patent Number: 6,003,349
[45] Date of Patent: Dec. 21, 1999

[54] VEHICLE LOCK DEVICE

[75] Inventors: Kazuaki Nagae; Yo Ichinose, both of Aichi, Japan

[73] Assignee: Kabushiki Kaisha Tokai Rika Denki Seisakusho, Niwa-gun, Japan

[21] Appl. No.: 09/161,755

[22] Filed: Sep. 29, 1998

[30] Foreign Application Priority Data

Sep. 29, 1997 [JP] Japan ................................... 9-264104

[51] Int. Cl.[6] .................................................. B06R 25/02
[52] U.S. Cl. .................................. 70/186; 70/252; 70/422
[58] Field of Search ............................ 70/181–189, 245, 70/252, 422

[56] References Cited

U.S. PATENT DOCUMENTS

| | | | |
|---|---|---|---|
| 3,442,102 | 5/1969 | Butts | 70/422 X |
| 3,828,594 | 8/1974 | Yamamoto | 70/186 X |
| 4,309,882 | 1/1982 | Maiocco | 70/186 |
| 4,333,325 | 6/1982 | Morikawa et al. | 70/186 |
| 4,495,786 | 1/1985 | Masaki et al. | 70/186 |
| 4,516,415 | 5/1985 | Kobayashi et al. | 70/186 X |
| 4,581,909 | 4/1986 | Weber | 70/186 |
| 4,938,043 | 7/1990 | Burr | 70/186 X |
| 4,981,026 | 1/1991 | Sakuno et al. | 70/186 |
| 5,074,134 | 12/1991 | Wheadon | 70/189 X |
| 5,570,599 | 11/1996 | Konii | 70/186 |
| 5,653,131 | 8/1997 | Shibata et al. | 70/186 X |
| 5,730,014 | 3/1998 | Berger et al. | 70/189 X |
| 5,732,580 | 3/1998 | Garnault et al. | 70/422 |
| 5,775,147 | 7/1998 | Wittwer | 70/422 X |
| 5,816,086 | 10/1998 | Russell, IV | 70/422 |

FOREIGN PATENT DOCUMENTS

| | | | |
|---|---|---|---|
| 2035282 | 1/1972 | Germany | 70/186 |
| 3541518 | 4/1987 | Germany | 70/186 |

*Primary Examiner*—Suzanne Dino Barrett
*Attorney, Agent, or Firm*—Morgan, Lewis & Bockius LLP

[57] ABSTRACT

A vehicle lock device is disclosed to impede a person from using a wrong key. When a key rotor is forcibly turned by a wrong key, the key rotor with the aid of tumblers turns a sleeve. The sleeve then moves slide members backward through a cooperative cam action. The front ends of the slide members have cam faces that are designed to correspond to guide grooves of the sleeve and recess portions of a rotor case. The backward movement of the slide members disengages a rotation transmitting member from the key rotor so that the key rotor is in an idle state.

4 Claims, 7 Drawing Sheets

IV—IV

VEHICLE LOCK DEVICE

BACKGROUND OF THE INVENTION

1. Field of the Invention

The present invention relates to a vehicle with an anti-lock mechanism.

2. Related art

A cylinder lock is attached to the front part of a lock device. In the cylinder lock, as known, a key rotor is rotatably disposed within a rotor case. A plural number of tumblers are radially movably mounted on the key rotor, while being urged by spring members in the protruding direction. To lock, the ends of the tumblers are brought into engagement with tumbler engaging grooves formed in the inner peripheral surface of the rotor case, whereby the key rotor is locked in its rotation. When a correct key is inserted into a key hole of the key rotor in this locking state of the device, the key moves the tumblers to disengage from the tumbler engaging grooves. In this state, the key is turned and then the key rotor is turned.

A lock member to be rotated together with the key rotor is provided on the cylinder lock. The lock member controls to lock and unlock a locking mechanism.

There is a case where someone forcibly unlocks the lock device for crime purposes, for example, by inserting a key altered for crime purposes (referred to as a wrong key) or a screwdriver into a key hole of the key rotor. A possible measure taken for this type of unlocking is as follows:

A mechanically weak part is formed at a mid part of the key rotor when longitudinally viewed. When the key rotor is turned by a rotational force in excess of a predetermined value of force, the weak part is broken. When the weak part is broken, the key rotor is turned, but the lock member is not turned. Therefore, there is no chance of unlocking the locking mechanism.

For this reason, the above measure is cable of preventing the theft of the vehicle, but needs replacement of broken parts with correct ones since the key rotor is broken.

SUMMARY OF THE INVENTION

Accordingly, an object of the present invention is to provide a lock device which rejects its unlocking without any damage of related parts when the key rotor is forcibly by a wrong key.

To achieve above object, there is provided a lock device comprising:

a rotor case fixedly mounted onto a body;

a sleeve, rotatably disposed within said rotor case, having axially extending guide grooves formed in the outer peripheral surface thereof and tumbler engaging grooves formed in the inner eripheral surface thereof;

a key rotor, rotatably disposed within said sleeve, having a plural number of radially extending tumbler locating grooves, and an engaging portion formed at the rear part of said key rotor, said key rotor being rotatable by a key;

tumblers, movably located in said tumbler locating grooves, respectively in a state that spring members, respectively, urge said tumblers in the direction in which said tumblers are protruded out of said tumbler locating grooves, said tumbler operating such that before said key is inserted into said key rotor, one end of each said tumbler is protruded from said tumbler locating grooves and brought into engagement with said tumbler engaging grooves, and when a correct key is inserted into said key rotor, said tumblers are moved into said tumbler locating grooves;

a lock member to be rotated together with the key rotor, said lock member being provided on said cylinder lock, a rotation of said lock member controlling to lock and unlock a locking mechanism;

a rotation transmitting member having a reception engaging portion at the front part thereof, which will receive and be engaged with said engaging portion of said key rotor in a disengaging manner, said rotation transmitting member being axially movably disposed between said lock member and said key rotor;

prepressed means urging said rotation transmitting member in the direction in which said reception engaging portion is brought into engagement with said engaging portion, and when said reception engaging portion is engaged with said engaging portion, said rotation transmitting member transmitting a rotation force of said key rotor to said lock member;

slide members being axially movably located in said guide grooves of said sleeve while being in contact with said rotation transmitting member, and being rotated together with said sleeve; and cam means located between the fore ends of said slide members and said rotor case, when said sleeve is turned together with said key rotor by a force in excess of a predetermined value of force in a state that said tumblers are engage with said tumbler engaging grooves, said slide members are moved backward through a cam action, to thereby disengage said engaging portion from said reception engaging portion.

In the thus constructed steering lock device, when the key rotor is turned by use of a wrong key, at least some of the tumblers are engaged with the tumbler engaging grooves. Therefore, the sleeve is turned together with the key rotor.

When the sleeve is turned by a rotation force below a predetermined force of rotation, an engaging force of the cam means located between the fore ends of the slide members and the rotor case locks the sleeve and the key rotor in their rotation.

When the sleeve is turned together with the key rotor by a force in excess of a predetermined value of force, the slide members are moved backward through a cam action by the cam means, With the backward movement of the slide members, the rotation transmitting member while resisting the urging force of the spring members. As a result, the reception engaging portion of the rotation transmitting member is disengaged from the engaging portion of the key rotor. In this state, the rotation force of the key rotor is not transmitted to the cam shaft, and the key rotor is in an idling state.

DETAILED DESCRIPTION OF PREFERRED EMBODIMENTS

A two-wheeled motorized vehicle steering lock device which is the preferred embodiment of the present invention will be described with reference to the accompanying drawings.

Figure 1:
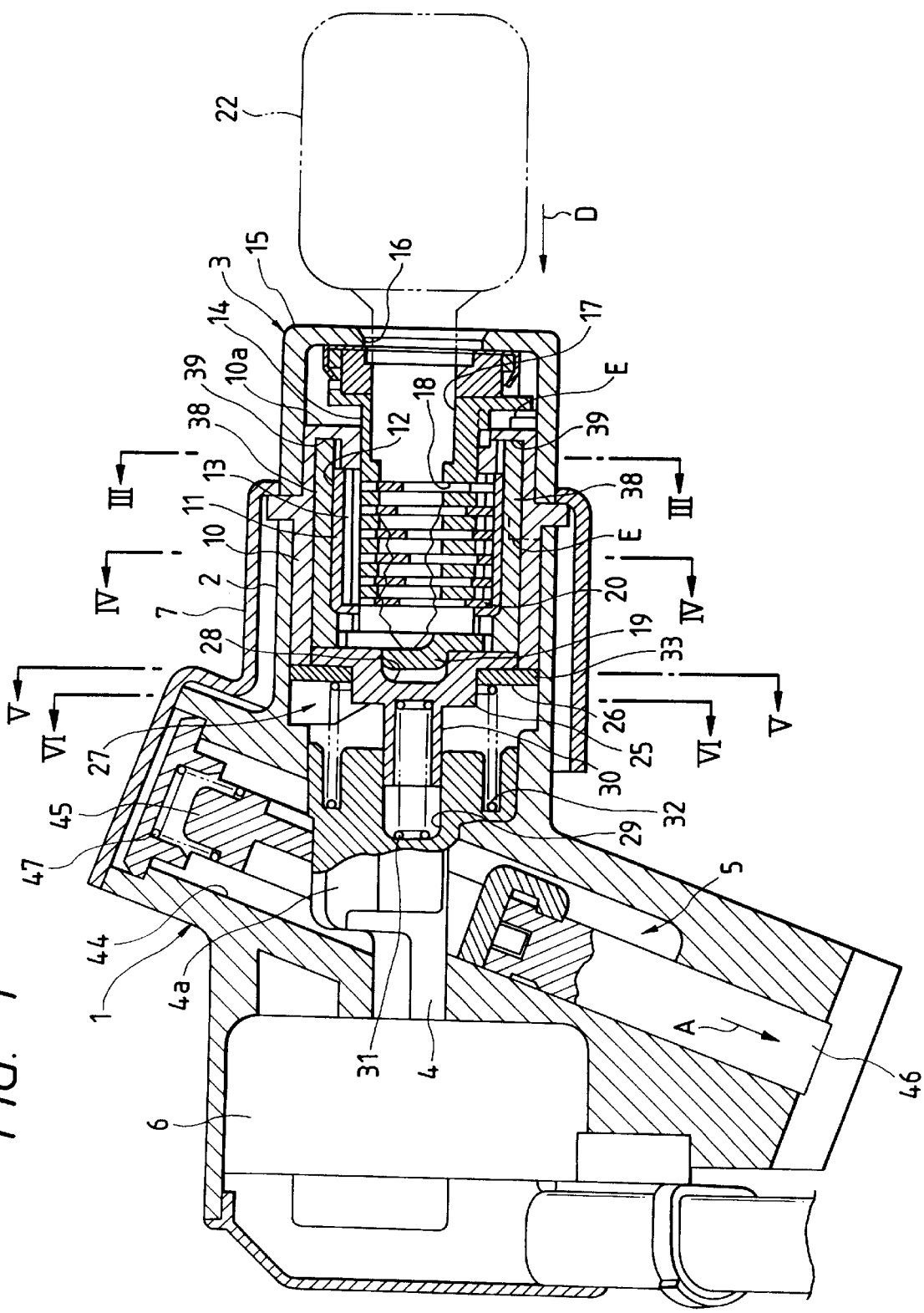
FIG. 1 is a longitudinal sectional view showing a two-wheeled motorized vehicle steering lock device which is an embodiment of the present invention, the steering lock device being in a state that a key rotor is set at an "off" position.
Figure 2:
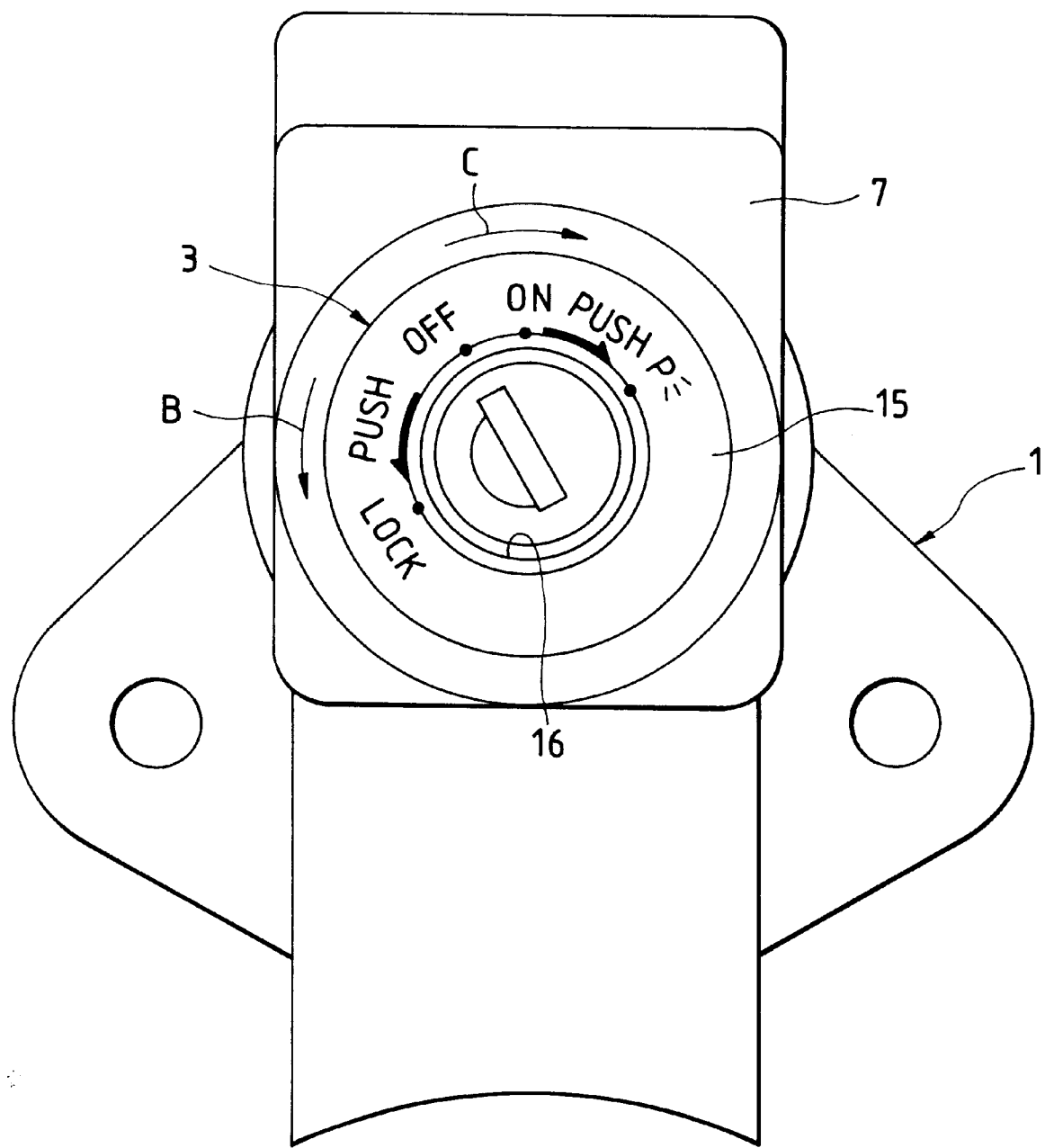
FIG. 2 is a front view showing the steering lock device of FIG. 1.
Figure 3:
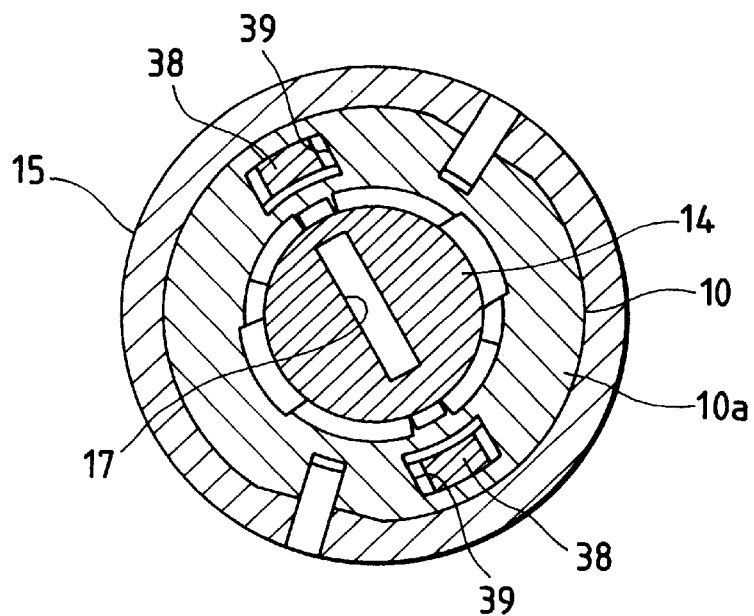
FIG. 3 is a cross sectional view taken on line A—A in FIG. 1.

In FIGS. 1 and 2, a body 1 of the steering lock device is fixedly mounted at a position near a steering shaft (not shown) of a two-wheeled motorized vehicle. A cylinder lock 3 is disposed in a front tubular portion 2 of the body 1. A cam shaft 4 with a protruded cam portion 4a and a steering locking mechanism 5 are disposed at the substantially central portion of the body 1. An ignition switch 6 coupled with the rear part of the cam shaft 4 is disposed in the rear portion of the body 1. A cap 7 is applied to the outside of the front tubular portion 2.

Figure 4:
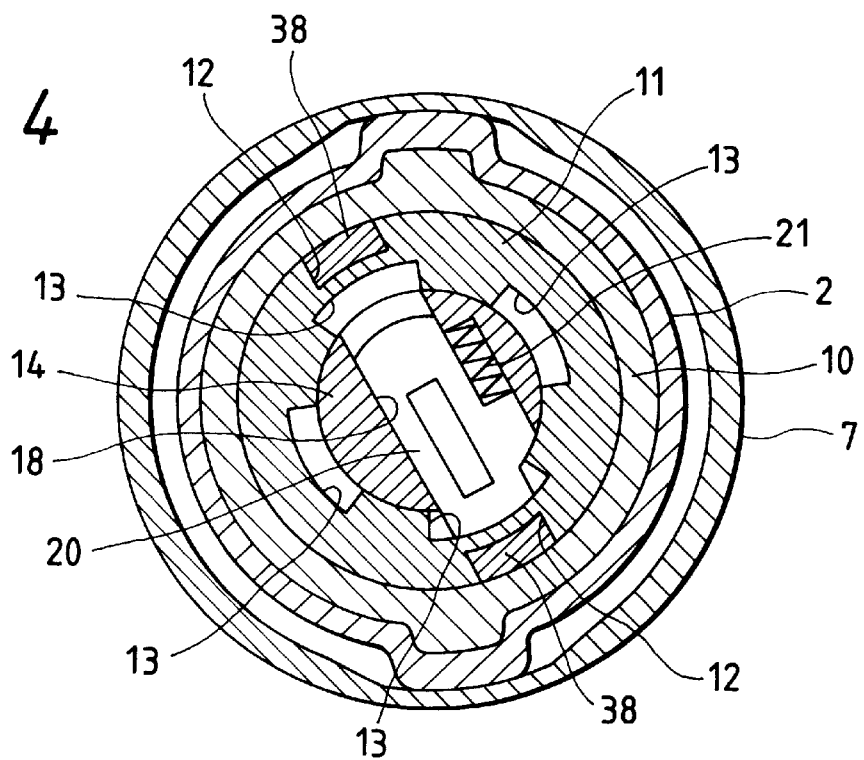
FIG. 4 is a cross sectional view taken on line B—B in FIG. 1.

A rotor case 10 of the cylinder lock 3, cylindrical in shape, is fixedly attached to the front tubular portion 2. A sleeve 11, cylindrical in shape, is rotatably disposed within the rotor case 10. A couple of guide grooves 12, axially extended, are formed in the outer peripheral surface of the sleeve 11 while being oppositely disposed to each other when seen in cross section (also illustrated in FIG. 4). A quaternary or two couples of tumbler engaging grooves 13 are formed in the inner periphery surface of the sleeve 11 while each couple of tumbler engaging grooves 13 are oppositely disposed and a straight line connecting one couple of the tumbler engaging grooves 13 is perpendicular to a straight line connecting another couple of tumbler engaging grooves 13.

A key rotor 14 is rotatably inserted into the sleeve 11 in a state that the front part of the key rotor:r 14 is protruded forward beyond the rotor case 10. A case 15 is applied to the front part of the cylinder lock 3, thereby covering the front part of the rotor case 10 and that of the key rotor 14. A circular opening 16 is formed in the front end (the right side in FIG. 1) of the case 15. "LOCK", "OFF", "ON", "P" and others are marked on the front end surface of the case 15 while being arranged around the circular opening 16.

A key insertion hole 17, while axially extending, is formed in the key rotor 14. A plural number of tumbler locating grooves 18, which radially extend, are formed in the key rotor 14. An engaging protruding portion 19 as an engaging portion is integral with the rear part of the key rotor 14. Tumblers 20 are movably located in the tumbler locating grooves 18, respectively. In this case, prepressed means, e.g., spring members 21 urge respectively the tumblers 20 in the direction in which the tumblers 20 are protruded out of the tumbler locating grooves 18.

In this case, the cylinder lock 3 allows a key 22 to be inserted into and pulled out of the key rotor 14 when the key rotor is located at any of the positions "LOCK", "OFF" and "P".

A rotation transmitting member 27, which is formed with a slider 25 and a plate 26 applied to the slider 25 from the rear side of the slider, is disposed between the cylinder lock 3 and the cam shaft 4 in a state that it is movable in the axial direction. The front side of the slider 25 has an engaging recess portion 28 as a reception engaging portion which will receive and be engaged with the engaging protruding portion 19 of the key rotor 14 in a disengaging manner. A fitting cylindrical portion 30 which is fit into a fitting recess portion 29 of the cam shaft 4, is provided on the rear side of the slider 25. A spring member 31 is located between the fitting cylindrical portion 30 and the fitting recess portion 29, and a spring member 32 is located between the plate 26 and the cam shaft 4. The urging forces of the spring members 31 and 32 urge the rotation transmitting member 27 in the direction in which the engaging recess portion 28 is brought into engagement with the engaging protruding portion 19.

In this case, the fitting cylindrical portion 30 of the slider 25 is left being fit to the fitting recess portion 29 of the cam shaft 4. When the key rotor 14 is turned in a state that the engaging recess portion 28 of the slider 25 is in engagement with the engaging protruding portion 19 of the key rotor 14, a rotation of the key rotor 14 is transmitted to the cam shaft 4, through the rotation transmitting member 27.

Figure 5:
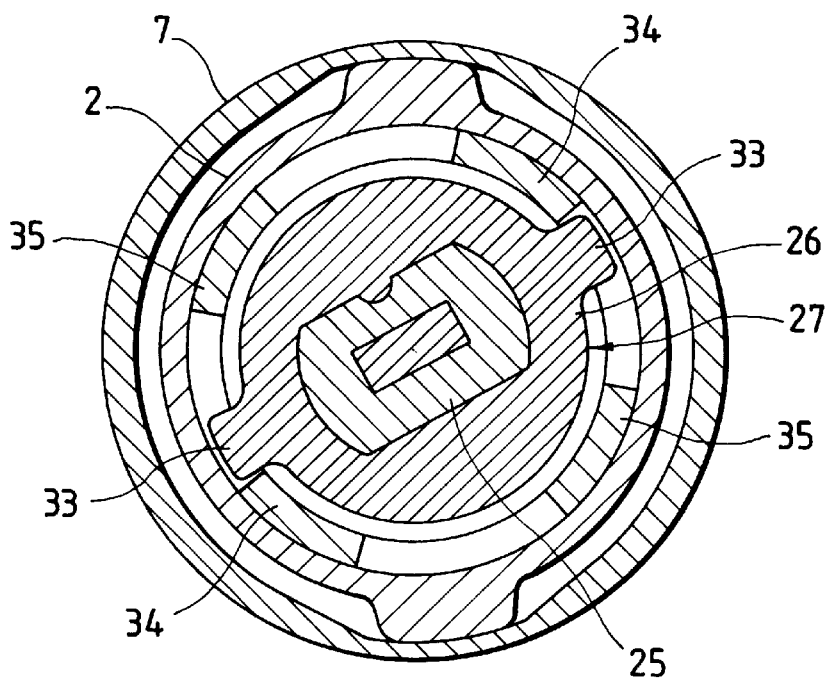
FIG. 5 is a cross sectional view taken on line C—C in FIG. 1.
Figure 6:
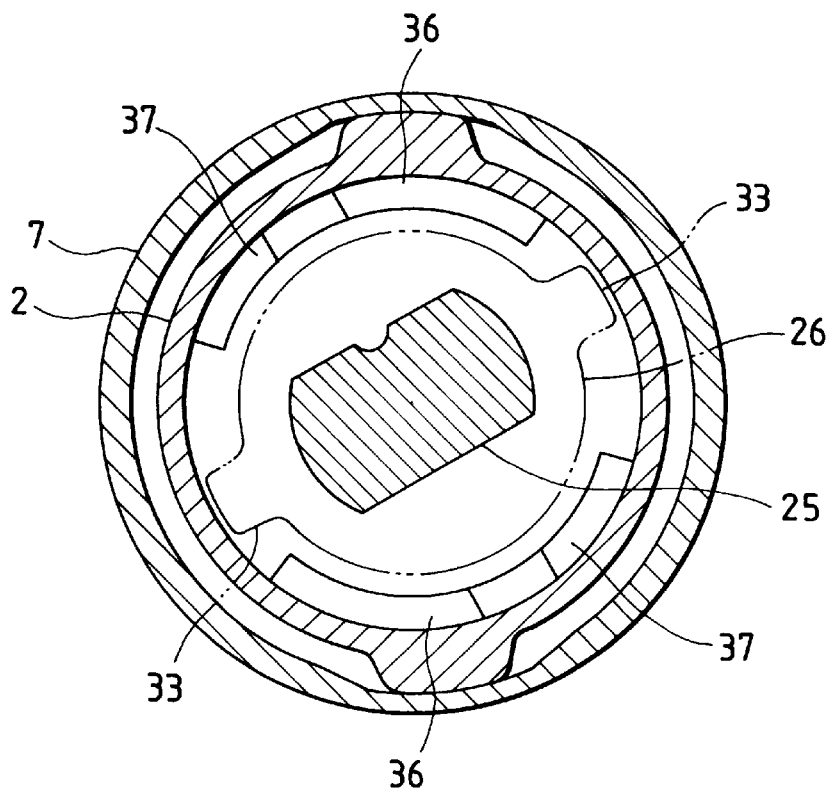
FIG. 6 is a cross sectional view taken on line S—S in FIG. 1.
Figure 8:
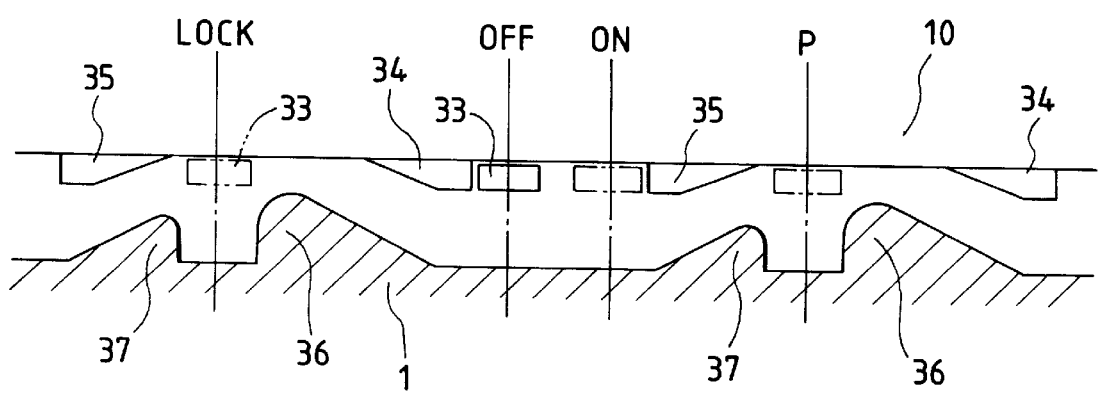
FIG. 8 is a development showing checking raised parts of a rotor case and raised guides of a body.
Figure 9:
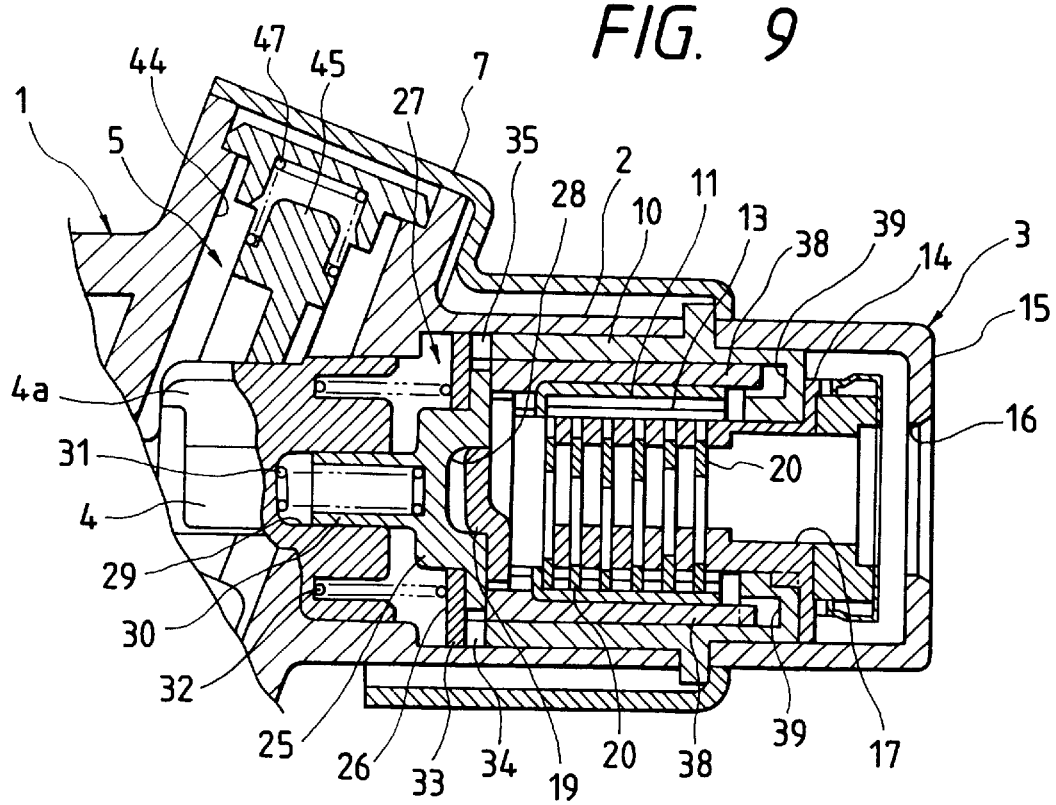
FIG. 9 is a longitudinal sectional view showing a part of the steering lock device in which a key rotor is inserted into the device.

A couple of protrusions 33, while oppositely disposed, are protruded from the outer periphery face of the plate 26 (FIG. 5). To check the movement of the protrusions 33, a couple of raised parts 34 and 35 are provided on the rear end of 1he rotor case 10, while protruding to the rear side (FIG. 8). The body 1 includes couples of raised guides 36 and 37, which are protruded forward, at locations where those guides are confronted with the plate 26.

The checking raised parts 34 for checking the movement of the protrusions 33 of the plate 26 are formed at the rear end of the rotor case 10. Therefore, when the key rotor 14 is turned from "OFF" to "LOCK" and from "ON" to "P", it is necessary to push the key rotor 14 rearward (downward in FIG. 8) while resisting the urging forces of the spring members 31 and 32, to thereby retract rearward the protrusions 33 from the positions of the checking raised parts 34 and 35.

Figure 7:
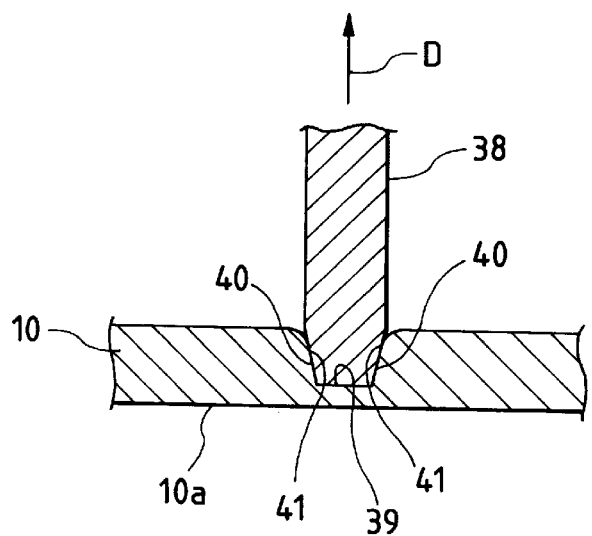
FIG. 7 is a cross sectional view taken on line E—E in FIG. 1.

Slide members 38 like bars are being axial lovably located in the guide grooves 12 of the sleeve 11. The fore and rear ends of the slide members 38 are protruded outward from the guide grooves 12 when viewed in the axial direction, and the rear ends thereof are in contact with the outer periphery of the front end face of the slider 25 of the rotation transmitting member 27. Recess portions 39, each opened to the rear side, are formed in the rear side of the front portion 10a of the rotor case 10 at locations corresponding to the slide members 38. The front ends of the slide members 38 are inserted into those recess portions 39, respectively. As shown in FIG. 7, the right and left sides of the fore end of each slide member 38 are slanted to form cam faces 40, and the corresponding locations of the inner surface of each recess portion 39 are also slanted to form cam, faces 41. Those cam faces 40 and 41 form cam means.

The steering locking mechanism 5 includes a movable cam frame 45, a lock bar 46 and a spring member 47. The movable cam frame 45 is located within a housing 44 of the body 1 in a state that the movable cam frame 45 is movable in the direction which obliquely intersects the axis of the cam shaft. The lock bar 46 is coupled with one end of the movable cam frame 45. The spring member 47 urges the movable cam frame 45 and the lock bar 46 in the direction of an arrow A. With rotation of the cam shaft 4, the movable cam frame 45 and the lock bar 46 are movable in the direction of the arrow A and in the direction opposite to the former by the protruded cam portion 4a.

In a state that the cam shaft 4 or the key rotor 14 is turned to the position "LOCK" or "P", the steering locking mechanism 5 operates in the following manner. The fore end of the lock bar 46 is protruded from the housing 44 and engaged with an engaging groove of the steering shaft (not shown), whereby the steering shaft is locked in its rotation.

The operation of the steering lock device thus constructed will be described.

A structural state of the steering lock device in which the key rotor 14 is turned to the position "OFF" is illustrated in FIGS. 1 and 2. In this state, the ignition :switch 6 is in an off state; the lock bar 46 of the steering locking mechanism 5 is at a disengaging position; and the steering .Locking mechanism 5 is in an unlocking state. In a state that nothing is inserted into the key insertion hole 17, the tumblers 20 are respectively protruded from the tumbler locating grooves 18 into the tumbler engaging grooves 13 of the sleeve 11.

Figure 11:
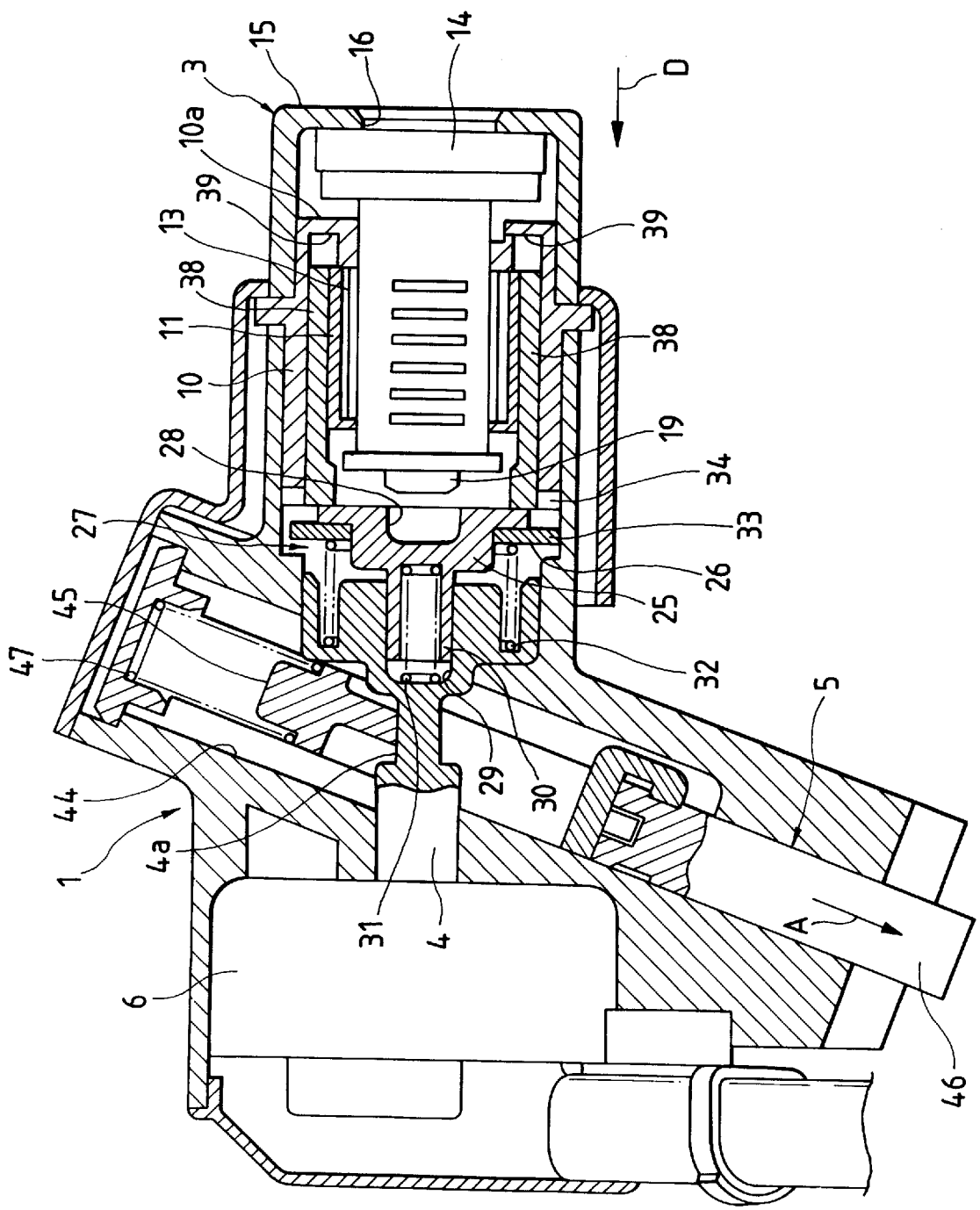
FIG. 11 is a longitudinal sectional view showing a part of the steering lock device in which the key rotor is disengaged from the rotation transmitting member when the device is in a "LOCK" state.

When the key 22, which is correct, or not altered, is inserted into the key insertion hole 17, the tumblers 20 are moved, by the key 22, so as to be put into the tumbler locating grooves 18 while resisting the urging forces of the spring members 21. To turn the key rotor 14 to the position "LOCK" from this state, the key rotor 14 is first pushed. Then, the protrusions 33 of the plate 26 retract from the checking raised parts 34 and 35. Thus, the key rotor 14 is turned in the direction of an arrow B (FIG. 2) while pushing the key rotor 14. When the key rotor L4 is turned to the position "LOCK", the steering locking mechanism 5 operates such that the movable cam frame 45 and the lock bar 46 move in the direction of the arrow A, and the lock bar 46 comes in engagement with the steering shaft to be in a locked state (FIG. 11).

When the key rotor 14 is turned in the direction of an arrow C, opposite to the direction of the arrow B (FIG. 2), to the position "ON" in a state that the key rotor 14 is in th(e position "OFF", the ignition switch 6 is turned on through the cam shaft 4. In this state, a start switch (not shown) is operated or a kick lever (not shown) is kicked to start up the vehicle engine. Incidentally, if the key rotor 14 is turned up to the position "ON", the steering locking mechanism 5 is left unlocked.

To turn the key rotor 14 from the position "ON" to the position "P", the key rotor 14 is turned in the direction of the arrow C while pushing the key rotor 14. When the key rotor 14 is turned to the position "P", the ignition switch 6 is a parking mode; a light (not shown) is lit up; and the steering locking mechanism 5 is in a locked mode as at the position "LOCK".

Let us consider a case where a wrong key is inserted into the key insertion hole 17 in a state that the key rotor 14 is at the position "OFF". In this case, the key rotor 14 is forcibly turned in the direction of the arrow B or C in a state that the key rotor 14 is pushed. At this time, the tumblers 20 are engaged with the tumbler engaging grooves 13 of the sleeve 11. Therefore, the sleeve 11 is also turned together with the key rotor 14.

When the sleeve 11 is turned together with the key rotor 14 by a force in excess of a predetermined value of force, the cam faces 40 of the fore ends of the slide members 38 are brought into engagement with the cam faces 41 of the recess portions 39. As a result, the sleeve 11 and the key rotor 14 are checked in their rotation, and the cam shaft 4 is also checked in its rotation.

Figure 10:
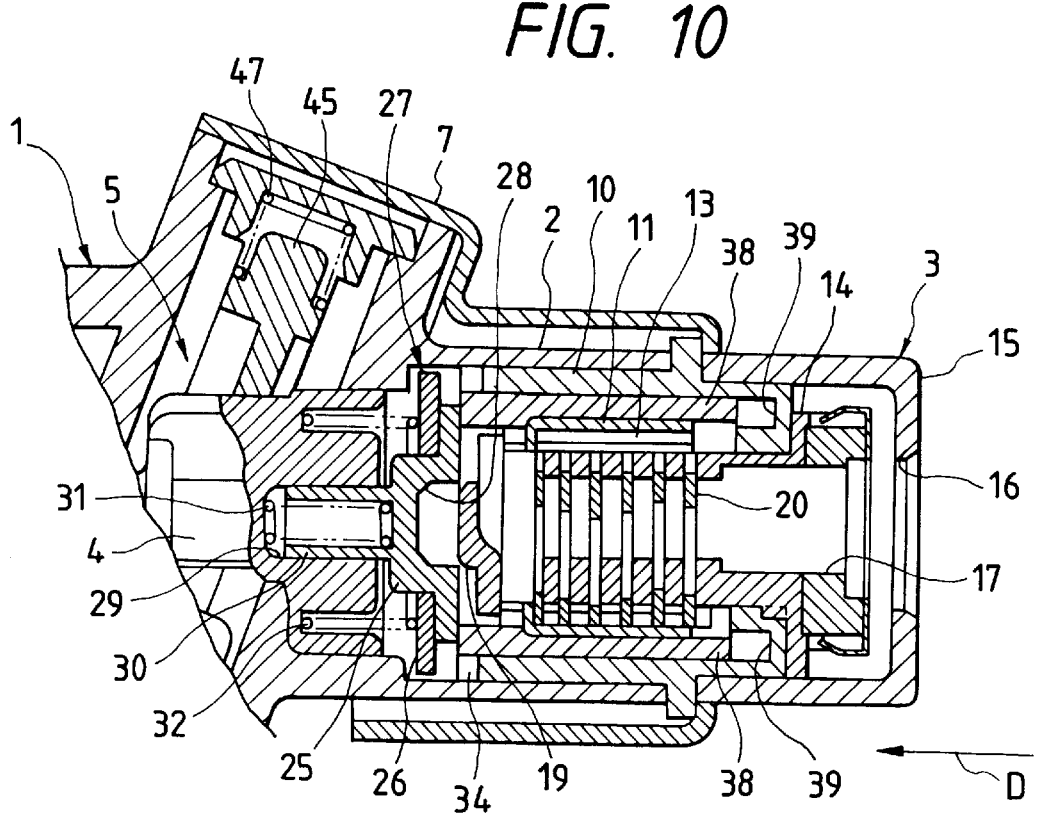
FIG. 10 is a longitudinal sectional view showing a part of the steering lock device in which the key rotor is disengaged from a rotation transmitting member.

When the sleeve 11 is turned together with the key rotor 14 by a force in excess of a predetermined value of force, the slide members 38 are moved backward (in the direction of the arrow D in FIGS. 1 and 7) through a cooperative cam action of the cam faces 40 and the cam faces 41. With the backward movement of the slide members 38, the rotation transmitting member 27 is moved backward while resisting the urging force of the spring members 31 and 32. As a result, the engaging recess portion 28 of the slider 25 is disengaged from the engaging protruding portion 19 of the key rotor 14 (FIG. 10). When this state is set up, a rotation force of the key rotor 14 is not transmitted to the cam shaft 4, and the key rotor 14 is put in an idling state and fails to unlock.

At this time, the fore end of the slide members 38 is in contact with the rear side of the front portion 10a of the rotor case 10, and when reaching a position corresponding to the recess portions 39, it is inserted into the recess portions 39 again.

Also in a case where the key rotor 14 is forcibly turned by means of the wrong key in a state that the key rotor 14 is at the position "LOCK" or "P", the sleeve 11 and the key rotor 14 are check in their rotation and the cam shaft 4 is also checked in its rotation when the sleeve 11 and the key rotor 14 are turned by a rotating force below a predetermined value of force. When the sleeve 11 and the key rotor 14 are turned by a rotating force above a predetermined value of force, the rotation transmitting member 27 is moved backward through the cam action of the cam faces 40 and the cam faces 41, so that the engaging protruding portion 19 of the key rotor 14 is disengaged from the engaging recess portion 28 of the slider 25 (FIG. 11). In the illustration of FIG. 11, the key rotor 14 is not pushed backward. In this state, the rotation force of the key rotor 14 is not transmitted to the cam shaft 4, and the key rotor 14 is put in an idling state. In this case, the steering locking mechanism 5 is kept locked.

When the key rotor 14, which is at any of the positions "LOCK", "OFF" and "P", is forcibly turned by means of the wrong key, the steering lock device of the embodiment operates such that the rotation transmitting member 27 is moved backward through the cam action of the cam faces 40 and 41, with the aid of the slide members 38; the engaging protruding portion 19 of the key rotor 14 is disengaged from the engaging recess portion 28 of the rotation transmitting member 27; and the key rotor 14 is idling. The result is to prevent the unlocking of the steering lock device and to prevent the related parts thereof from being broken. And thereafter, the user can use the steering lock device as usual or without any exchanging of parts.

It will be understood that the invention may be modified, altered and changed without departing from the true spirits and scope of the invention. For example, three slide members 38 may be provided.

As seen from the foregoing description, when a key rotor of a vehicle lock device of the invention is forcibly turned by means of, for example, a wrong key, a rotation transmitting member is moved backward through a cam action of cam means with the aid of slide members. With this motion, the key rotor is disengaged from the rotation transmitting member, and the key rotor is in an idling state. Therefore, there is no chance of unlocking of the device and breaking the related parts of the device.

What is claimed is:

1. A lock device comprising:

a rotor case fixedly mounted onto a body;

a sleeve having an inner and outer peripheral surface, rotatably disposed within said rotor case, including axially extending guide grooves formed in said outer peripheral surface and tumbler engaging grooves formed in said inner peripheral surface;

a key rotor having a rear part, rotatably disposed within said sleeve, including a plural number of radially extending tumbler locating grooves, and in engaging portion formed at said rear part, wherein said key rotor is rotatable by a key;

tumblers, movably located in said tumbler locating grooves, respectively in a state that spring members urge said tumblers in a direction in which said tumblers are protruded out of said tumbler locating grooves, wherein said tumblers operate such that before said key is inserted into said key rotor, one end of each of said tumblers protrudes from said tumbler locating grooves and is brought into engagement with said tumbler engaging grooves, and when a correct key is inserted into said key rotor, said tumblers are moved into said tumbler locating grooves;

a lock member disposed in said body to be rotated together with the key rotor, wherein rotation of said lock member will lock and unlock a locking mechanism;

a rotation transmitting member having a reception engaging portion at a front part thereof, which will receive and be engaged with said engaging portion of said key rotor in a disengaging manner, wherein said rotation transmitting member is axially movably disposed between said lock member and said key rotor;

prepressed means urging said rotation transmitting member in the direction in which said reception engaging portion is brought into engagement with said engaging portion, and when said reception engaging portion is engaged with said engaging portion, said rotation transmitting member transmits a rotational force of said key rotor to said lock member;

slide members having first ends being axially movably located in said guide grooves of said sleeve while being in contact with said rotation transmitting member, and being rotated together with said sleeve; and cam means located between said first ends of said slide members and said rotor case, wherein when said sleeve is turned together with said key rotor by a force in excess of a predetermined value of force in a state such that said tumblers are engaged with said tumbler engaging grooves, said slide members are moved backward through a cam action, to thereby disengage said engaging portion from said reception engaging portion.

2. A lock device as claimed in claim 1, wherein said lock member is a steering lock device.

3. A lock device as claimed in claim 1, further comprising: a cam shaft being located on said rear part of said key rotor and rotatably mounted on said body, said cam shaft controlling an ignition key when rotated and also locking and unlocking a steering shaft through an operation of a steering locking mechanism, wherein said lock member is a protruded cam portion of said cam shaft.

4. A lock device as claimed in claim 2, wherein said steering lock device is a two-wheeled motorized vehicle steering lock device.

* * * * *